3,457,186
HOMOGENEOUS IRON COORDINATION
CATALYSTS
William E. Marsico, Lake Charles, La., assignor to Columbian Carbon Company, New York, N.Y., a corporation of Delaware
No Drawing. Filed Sept. 30, 1964, Ser. No. 400,543
Int. Cl. B01j 11/22
U.S. Cl. 252—429    22 Claims

ABSTRACT OF THE DISCLOSURE

A description is provided of the preparation of highly active homogeneous iron coordination catalysts by the interaction of a ferric compound, an aluminum alkyl and a phosphorus ester having at least one phosphinic hydrogen group. The use of such catalysts is illustrated by the homopolymerization of alkylene oxides and conjugated dienes and the interpolymerization of conjugated dienes with alpha olefins. alpha unsaturated nitriles or alkylene oxides.

This invention relates to novel compositions of matter which are useful as catalysts for the polymerization of various polymerizable organic monomers. More particularly, it relates to certain coordination complexes of iron which can be used to catalyze the homopolymerization or interpolymerization of such organic monomers.

Coordination catalysts prepared by the interaction of iron compounds with various reducing agents in the presence of triorgano phosphines and phosphites are well known to the prior art. Such compositions have been suggested for use as catalysts for the preparation of cyclic and linear homo-oligomers of lower aliphatic conjugated diolefins and low molecular weight cooligomers of these diolefins with certain vinyl hydrocarbons; however, they have met with little commercial acceptance as catalyst for the production of high polymers because of the excessive induction periods and reaction times and low yields which often accompany their use. Furthermore, these known compositions have not been efficient catalysts for the production of high molecular weight, rubbery homopolymers or interpolymers of alkylene oxides.

A principal object of the present invention is to provide a versatile and inexpensive polymerization catalyst. Another object is to provide a readily prepared catalyst which is stable and highly active over a broad temperature range. Still another object is to provide an iron coordination catalyst which is homogeneous in hydrocarbon solution and which is suitable for the production of high molecular weight homopolymers of conjugated aliphatic dienes and interpolymers of these dienes with monoethylenically unsaturated hydrocarbons, oxiranes, and vinyl esters and nitriles. Still another object is to provide a means of effectively producing high molecular weight terpolymers of 1,3-butadiene, styrene and acrylonitrile. Further objects and features of advantages will be apparent from a consideration of the following detailed description of the invention.

The compositions of the present invention are admixture products of (a) an iron (III) compound, (b) a hydrocarbyl, hydrocarboxy or hydride compound of aluminum and (c) a phosphorus ester having at least one phosphinic atom. It has been found that the iron coordination compositions of this invention exhibit catalytic activity which is unexpectedly superior to that possessed by the similar coordination catalysts of the prior art. This superiority is manifest by a drastic reduction in reaction time and a multifold increase in high polymer selectivity over that experienced in the low temperature polymerization of conjugated dienes with the prior art catalysts. (Cf. Examples XIV and XV.) This high catalytic activity is further demonstrated by the fact that the catalyst compositions of this invention can be used in very low concentration to effect the rapid and efficient production of high molecular weight alkylene oxide homopolymers and interpolymers of alkylene oxides and conjugated diolefins.

Catalytic compositions which are within the scope of this invention can be prepared from any iron (III) compound. Illustrative of such iron (III) inorganic compounds are ferric fluoride, ferric iodide, ferric bromide, ferric chloride, ferric oxide, ferric hydroxide, ferric hypophosphite, ferric orthophosphate, ferric thiocyanate, ferric ferricyanide, ammonium ferricyanide, potassium ferric sulphate and others. Examples of iron (III) organic compounds which can be used in this invention include salts of acetic, propionic, hexanoic, ethyl hexanoic, oleic, stearic, oxalic, suberic, benzoic, trimellitic, citric, lactic, and tall oil acids, as well as ferric derivatives of alcohols, ketones, aldehydes and nitrogen containing organics such as dimethylglyoxime, 8-hydroxyquinoline, glycine, nitrosophenylhydroxylamine, etc., and complexes of organic molecules with inorganic ferric salts, such as tetrapyridine ferric chloride. From a practical viewpoint, however, it is often desirable to prepare the catalysts of this invention in solvent for one or more of the components. The use of such solvents, which are described in detail below, generally facilitates the rapid interaction and high utilization of the components, factors of which are of the utmost importance in commercial applications. Iron (III) compounds which have a significant solubility in said solvents are therefore highly desirable and represent a preferred source of the heavy metal component. Such preferred iron (III) sources include the ferric halides, such as ferric chloride; ferric salts of monobasic carboxylic acids, preferably having at least six carbon atoms, such as ferric naphthenate; and ferric chelates in which the organic chelating group is bonded to the iron with both conventional and coordination bonds, such as ferric acetyl acetonate.

The aluminum containing component of the catalyst of the instant invention may be any hydrocarbyl, hydrocarboxy or hydride compound of aluminum. Illustrative of such compounds are trimethyl aluminum, triisobutyl aluminum, trioctyl aluminum, tridodecyl aluminum, tricyclohexyl aluminum, triphenyl aluminum, tritolyl aluminum, phenoxydiethyl aluminum, diethoxyethyl aluminum, isobutyl aluminum dihydride, aluminum hydride and diethyl phenyl aluminum. A preferred class of aluminum containing components is represented by the general formula $$(R)_2Al—A \qquad (I)$$

wherein R is an alkyl radical and A is selected from the group consisting of alkyl, lower alkoxy and hydried radicals. Examples of such preferred compounds include tri (polyethylene) aluminum compounds in which each polyethylene group contains from about six to about thirty carbon atoms, ethoxydiethyl aluminum and diethyl aluminum hydride. Alkyl aluminum compounds such as triethyl aluminum and triisobutyl aluminum represent an especially preferred embodiment of this invention.

The phosphorus esters which have been found to be suitable for use as components of the catalyst compositions of this invention are those having at least one phosphinic hydrogen atom; i.e., esters having at least one hydrogen atom bonded directly to phosphorus, or tautomers thereof. Illustrative of such suitable esters are the following compounds:

dimethyl hydrogen phosphite,
diallyl hydrogen phosphite, dioctyl hydrogen phosphite,
didodecyl hydrogen phosphite,
dibenzyl hydrogen phosphite,
dicyclohexyl hydrogen phosphite,
di(p-methylphenyl) hydrogen phosphite,
phenyl isobutyl hydrogen phosphite,
di(2-phenylethyl) hydrogen phosphite,
di(2-methoxyethyl) hydrogen phosphite,
di(p-chlorophenyl) hydrogen phosphite,
di(2-methoxyphenyl) hydrogen phosphite,
methyl dihydrogen phosphite,
isopropyl dihydrogen phosphite,
2-ethylhexyl dihydrogen phosphite,
cyclohexyl dihydrogen phosphite,
phenyl dihydrogen phosphite,
p-chlorophenyl dihydrogen phosphite,
2-methoxyphenyl dihydrogen phosphite,
dimethyl phosphine,
diphenyl phosphine,
methyl phosphine oxide,
phenyl phosphine oxide,
dimethyl phosphine oxide,
diphenyl phosphine oxide,
methyl hydrogen phosphonite,
dodecyl hydrogen phosphonite,
phenyl hydrogen phosphonite,
methyl phosphinic acid,
2-ethylhexyl phosphinic acid,
benzyl phosphinic acid,
phenyl phosphinic acid,
p-methylphenyl phosphinic acid,
p-chlorophenyl phosphinic acid.

Many of these esters are known to exist as trivalent or pentavalent phosphorus tautomers, either of which can be used as a component of the catalyst compositions of this invention. Suitable esters of this type can be represented by the general formula

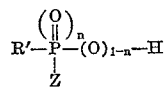 (II)

wherein Z is selected from the group consisting of H, R' and OH radicals, R' is selected from the group consisting of hydrocarbyl, substituted hydrocarbyl, hydrocarboxy, and substituted hydrocarboxy radicals and $n$ is from 0 to 1 inclusive. The nomenclature used above, while strictly applicable only to a single tautomer, is commonly applied to either tautomeric form and is so intended as used herein. For example, the name, methyl dihydrogen phosphite, while strictly applicable only to the structure

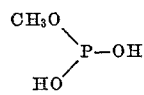 (III)

is, as used herein, intended to be inclusive of either this structure or its pentavalent phosphorus tautomer

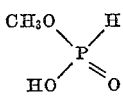 (IV)

as well as mixtures thereof. Similarly, it should be understood that the name methyl hydrogen phosphonate, which is strictly descriptive only of the pentavalent phosphorus tautomer, is to be given its common meaning, which encompasses both tautomeric forms.

Preferred groups of phosphorus esters are those which can be represented by the formulas

 (V)

and

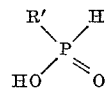 (VI)

wherein R' has the same meaning as set forth above. Esters of Formulas V and VI in which R' is a hydrocarboxy radical have been found to be especially suitable catalyst components. Typical of these unusually effective esters are phenyl phosphinic acid, phenyl dihydrogen phosphite, di(2-ethylhexyl) hydrogen phosphite and diphenyl hydrogen phosphite.

It has been found that the ratio of the components of catalysts of this invention may be varied over a wide range. A catalytically active composition can be produced with a molar ratio of iron to aluminium in the components of from about 1:0.1 to about 1:25 or higher. Similarly, the molar ratio of iron to phosphorus may be varied from about 1:01.1 to about 1:25 and higher. Molar ratios outside these ranges can be used; however, there is no apparent advantage in using very large excesses of any component. In general, it is preferred to utilize a molar ratio of iron to aluminum of from about 1:0.5 to about 1:10 and an iron to phosphorus ratio of from about 1:0.5 to about 1:8.

The order of addition of the catalyst components is not critical and the admixture may be effected either in the presence or absence of a solvent medium. It generally has been found, however, that the interaction of the components is facilitated by effecting the admixture in the presence of an inert solvent medium. Examples of such inert solvents include aromatic and aliphatic hydrocarbons which are free of ethylenic or acetylenic unsaturation, such as, benzene, toluene, xylene, isooctane, normal hexane and liquid propane, or saturated cyclic ethers such as, tetrahydrofuran and 1,4-dioxane. Ring substituted halogenated aromatics, such as chlorobenzene and p-chlorotoluene likewise can be satisfactorily utilized as inert solvents. Alternatively, the catalyst compositions may be formed in situ in a polymerization system, in which case the unreacted monomer or liquid polymer may serve as a solvent.

The catalyst compositions of this invention may be produced by admixing the components over a wide temperature range. Catalytic compositions can be obtained at temperatures above 250° C. and below −30° C.; however, it is seldom necessary or desirable to utilize temperatures outside the preferred range of from about 0° C. to about 150° C. The interaction of the components is generally extremely rapid and often is accompanied by a color change. Because of this rapid interaction and the stability of the product over a wide temperature range, the catalysts of this invention may be pre-formed and stored for substantial periods before being used in a polymerization reaction or they may be formed in the presence of the polymerizable monomers under conventional polymerization conditions.

Although these catalytic compositions are simple to prepare and are generally quite stable and insensitive to most extraneous materials, the incorporation therein of an aluminum hydrocarbyl or hydride requires that precautions be taken to isolate both the components and the interaction product from excessive quantities of water, oxygen, alcohol, carbon dioxide and other materials which are known to be reactive with these aluminum compounds. Small quantities of such reactive impurities are, of course, tolerable, however, it is preferred that they be essentially excluded in order to achieve maximum effectiveness of these catalyst compositions.

The following examples are illustrative of the preparation and use of representative species of the catalyst compositions of this invention.

EXAMPLE I

A clean dry magnetically stirred 300 milliliter autoclave is flushed with argon for five minutes and then charged with fifty milliliters of benzene, 0.25 grams (0.7 millimole) of ferric acetyl acetonate, 0.3 grams ,1.0 millimole) of di(2-ethylhexyl) hydrogen phosphite and 3 milliliters (4.5 millimoles) of a 20% by weight solution of triethyl aluminum in benzene. After stirring the autoclave at room temperature for five minutes, 31 grams (0.705 moles) of ethylene oxide is pressured into the autoclave and the temperature raised to 100° C. Stirring is continued at 100° C., plus or minus 5° C., for four and one-half hours. The autoclave is then vented and the catalyst deactivated by the addition of 20 milliliters of methanol. The solution is then stripped of solvent in a rotary evaporator at 100° C. under vacuum. The 17 grams of tough polymer film remaining represents a 55% conversion of ethylene oxide. Infrared analysis shows the product to be a typical polyether.

EXAMPLE II

Using the procedure of Example I, 43 grams of propylene oxide are reacted at 140° C. for two hours. The 15 gram yield of liquid poly (propyleneglycol) represents a 35% conversion of the monomer.

EXAMPLE III

The procedure of Example II is conducted at a temperature of 120° C. for a period of three hours. A 24% yield of tough polymer is recovered.

EXAMPLE IV

To a clean dry argon filled flask are added 0.25 grams of ferric acetyl acetonate, 0.5 gram of di(2-ethylhexyl) hydrogen phosphite, 3 milliliters of a 20% by weight solution of triethyl aluminum in toluene and 50 milliliters of toluene. After storing the sealed flask for 24 hours, its entire contents are introduced into a 500 milliliter magnetically stirred autoclave containing 34 grams of 1,3-butadiene and 30 grams of propylene oxide. Heating of the autoclave to 70° C. with vigorous stirring initiates a highly exothermic reaction. External heating is then withdrawn and the autoclave cooled so as to maintain the temperature of its contents below 145° C. and the pressure to less than 200 p.s.i.g. After 37 minutes, the autoclave is vented and the resulting polymer coagulated with 20 milliliters of methanol. The coagulated product is dried under vacuum to yield 34 grams of tough resilient polymer which is shown by infrared analysis to contain ether oxygen and an 8% cis, 7% trans and 85% vinyl olefin structure.

EXAMPLE V

The procedure of Example IV is repeated with 40 grams of 1,3-butadiene and 20 grams of ethylene oxide. The reaction is maintained at 70° C. for three hours to yield 32 grams of tough interpolymer having a vinyl content of 85%.

EXAMPLE VI

A clean dry magnetically stirred 300 milliliter autoclave is flushed with nitrogen and charged with 0.3 moles of 1,3-butadiene, 0.88 moles of propylene, 0.7 millimoles of ferric naphthenate and 2.8 millimoles of di(2-ethylhexyl) phosphite. Stirring and gentle heating is then commenced and 5 milliliters of a 20% solution of triisobutyl aluminum in toluene is introduced. The reaction temperature is maintained at 100° C. for two hours, at the end of which time, the autoclave is cooled and vented and the catalyst deactivated by the addition of 25 milliliters of 50% by volume aqueous methanol. The precipitated product is dried under vacuum to yield 19 grams of a tough interpolymer polymer having a cis:trans:vinyl ratio of 13%:14%:73% and a methylene to methyl group ratio of 4:1.

EXAMPLE VII

The general procedure of Example VI is utilized to polymerize 28 grams of 1,3-butadiene with 40 grams of acrylonitrile at 120° C. After four hours at this temperature, the catalyst is deactivated as in Example VI and the entire reactor contents is then introduced into 150 milliliters of normal hexane. The precipitated material is then removed from the hexane and dried under vacuum to yield five grams of interpolymer having a cis:trans:vinyl ratio of 21%:73%:6%.

EXAMPLE VIII

The general procedure of Example VI is used to cause rapid polymerization at 30 to 50° C. of 36 grams of 1,3-butadiene and 12 grams of ethylene.

EXAMPLE IX

A clean dry magnetically stirred 500 milliliter autoclave is flushed with argon for five minutes and charged with 50 milliliters of benzene, 0.7 millimoles of ferric chloride, 2.1 millimoles of phenyl phosphinic acid and 5 milliliters of a 20% by weight solution of triethyl aluminum in toluene. The autoclave contents are stirred at room temperature for ten minutes followed which are added 30 grams of acrylonitrile, 58 grams of styrene and 20 grams of 1,3-butadiene. After stirring the resulting solution at 100° C. for seven hours, the autoclave is vented and 25 milliliters of methanol added. Separation and drying of the precipitate yields 32 grams of tough hard interpolymer which, upon heating at 200° C. for one hour, gives a clear very hard resin film.

EXAMPLES X THROUGH XIII

The procedure of Example IX is repeated varying the mole ratio of the monomers charged as shown below:

| Example | Mol. ratio of butadiene: acrylonitrile: styrene in charge | Mol. percent butadiene: acrylonitrile: styrene in interpolymer product | Properties of interpolymer film (heated to 200° C. for 1 hr.) |
|---|---|---|---|
| X | 1:1:1 | 34:31:35 | Flexible, creases. |
| XI | 1:2:1 | 44:36:20 | Very flexible, does not crease. |
| XII | 1:1:2 | 20:24:56 | Brittle, breaks when bent. |
| XIII | 1:0.5:1 | 35:24:41 | Very flexible, does not crease. |

EXAMPLE XIV

A clean dry magnetically stirred 500 milliliter autoclave is flushed with nitrogen for five minutes and charged with 0.7 millimole of ferric acetyl acetonate, 0.7 millimole of triphenyl phosphite, 50 milliliters of dry benzene and 5 milliliters of a 20% by weight solution of triethyl aluminum in benzene. After stirring for five minutes, 56 grams of 1,3-butadiene is introduced. The autoclave is then heated to 100° C. and held at that temperature for 1 hour, following which, unreacted gases are vented and 25 milliliters of methanol added to deactivate the catalyst. Evaporation of the solvents and liquid butadiene oligomers yields a trace of solid polymer.

EXAMPLE XV

The process of Example XIV is repeated utilizing 0.7 millimole of diphenyl hydrogen phosphite in place of triphenyl phosphite. The exothermic nature of the reaction necessitates cooling of the autoclave so as to prevent the temperature from exceeding 100° C. Twelve minutes after the initiation of the reaction, the autoclave is vented and the reaction mixture worked up as in Example XIV, yielding 55 grams of solid polymer having a cis:trans:vinyl ratio of 10%:6%:84%.

EXAMPLE XVI

To a clean dry argon filled flask are added 0.2 grams of ferric acetyl acetonate, 0.5 grams of di(p-tolyl) hydrogen phosphite and 5 milliliters of a 20% by weight solution of triethyl aluminum in benzene. The sealed flask is shaken gently for ten minutes and its entire contents is then introduced into a 300 milliliter magnetically stirred autoclave containing 50 milliliters of dry benzene. Stirring is begun as 50 grams of 1,3-butadiene is introduced. The autoclave is then heated to 35 to 40° C., at which temperature, a vigorous exothermic reaction initiates and proceeds, in the absence of additional external heating, to a maximum of 175° C. Deactivation of the catalyst with 50 milliliters of aqueous phosphoric acid, separation of the aqueous phase and evaporation of the solvents yields 50 grams of a tough, highly cross-linked 1,2-polymer.

I claim:
1. A homogeneous composition comprising a liquid hydrocarbon and the interaction product of:
  (a) a hydrocarbon soluble iron (III) compound,
  (b) an aluminum compound selected from the group consisting of hydrocarbyl, hydrocarboxy and hydride compounds of aluminum, and
  (c) a phosphorus ester having at least one phosphinic hydrogen atom.
2. A catalyst composition which is homogeneous in hydrocarbon solution comprising an interaction product of components consisting essentially of:
  (a) a hydrocarbon soluble iron (III) compound,
  (b) an aluminum compound of the formula

wherein R is an alkyl radical and A is selected from the group consisting of alkyl, alkoxy and hydride radicals, and
  (c) a phosphorus ester having at least one phosphinic hydrogen atom, of the formula

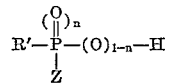

wherein Z is selected from the group consisting of H, R' and OH radicals, R' is selected from the group consisting of hydrocarbyl, substituted hydrocarbyl, hydrocarboxy and substituted hydrocarboxy radicals, and $n$ is from 0 to 1 inclusive.
3. A composition of claim 2 wherein said iron compound is selected from the group consisting of ferric salts of halogen and carboxylic acids and ferric chelates.
4. A composition of claim 3 wherein said iron compound is a ferric salt.
5. A composition of claim 3 wherein said iron compound is ferric naphthenate.
6. A composition of claim 3 wherein said iron compound is ferric chloride.
7. A composition of claim 3 wherein said iron compound is a ferric chelate.
8. A composition of claim 7 wherein said chelate is ferric acetylacetonate.
9. A composition of claim 2 wherein said aluminum compound is a trialkyl aluminum.
10. A composition of claim 9 wherein said aluminum compound is triethyl aluminum.
11. A composition of claim 2 wherein said phosphorus ester is of the formula

12. A composition of claim 11 wherein R' is a hydrocarboxy group.
13. A composition of claim 12 wherein R' is an aroxy group.
14. A composition of claim 12 wherein R' is an alkoxy group.
15. A composition of claim 11 wherein R' is an aryl group.
16. A composition of claim 11 wherein R' is an alkyl group.
17. A composition of claim 2 wherein Z is a hydroxy group.
18. A composition of claim 1 wherein the molar ratio of iron to phosphorus is from about 1:0.1 to about 1:25.
19. A composition of claim 1 wherein the molar ratio of iron to aluminum is from about 1:0.1 to about 1:25.
20. A process for the production of a homogeneous iron coordination catalyst composition comprising interacting, in inert solvent, components consisting essentially of:
  (a) a hydrocarbon soluble iron (III) compound,
  (b) a reducing agent selected from the group consisting of hydrocarbyl, hydrocarboxy and hydride compounds of aluminum, and
  (c) a phosphorus ester having at least one phosphinic hydrogen group.
21. A process for the production of a homogeneous iron coordination catalyst composition comprising interacting, in an inert solvent, components consisting essentially of:
  (a) a hydrocarbon soluble iron (III) compound,
  (b) an aluminum compound of the formula

wherein R is an alkyl radical and A is selected from the group consisting of alkyl, alkoxy and hydride radicals, and
  (c) a phosphorus ester having at least one phosphinic hydrogen atom.
22. A process for the production of a homogeneous iron coordination catalyst composition comprising interacting components consisting of (a), (b), and (c) in an inert solvent at a temperature of from about −30° C. to about 300° C., wherein:
  (a) is a hydrocarbon soluble iron (III) compound selected from the group consisting of ferric salts of halogen and monocarboxylic acids and ferric chelates,
  (b) is a trihydrocarbyl aluminum, and
  (c) is a phosphorus ester having at least one phosphinic hydrogen atom, of the formula

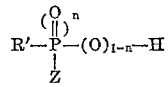

wherein Z is selected from the group consisting of H, R', and OH radicals, R' is selected from the group consisting of hydrocarbyl, substituted hydrocarbyl, hydrocarboxy and substituted hydrocarboxy radicals, and $n$ is from 0 to 1 inclusive, and
the molar proportions of iron, aluminum and phosphorus in said components being 1:0.1:0.1 to 1:25:25.

References Cited

UNITED STATES PATENTS

| | | | |
|---|---|---|---|
| 2,977,350 | 3/1961 | Fasce et al. | 260—94.9 |
| 3,152,088 | 10/1964 | Sandri et al. | 252—429 |
| 3,207,741 | 9/1965 | Schafer et al. | 252—428 |
| 3,240,747 | 3/1966 | Heitmiller et al. | 260—94.9 |
| 3,408,418 | 10/1968 | Iwamoto et al. | 260—429 XR |

PATRICK P. GARVIN, Primary Examiner

U.S. Cl. X.R.

252—428, 430, 431; 260—2, 82.5, 85.3, 94.3, 80.7